United States Patent Office 2,727,611
Patented Dec. 20, 1955

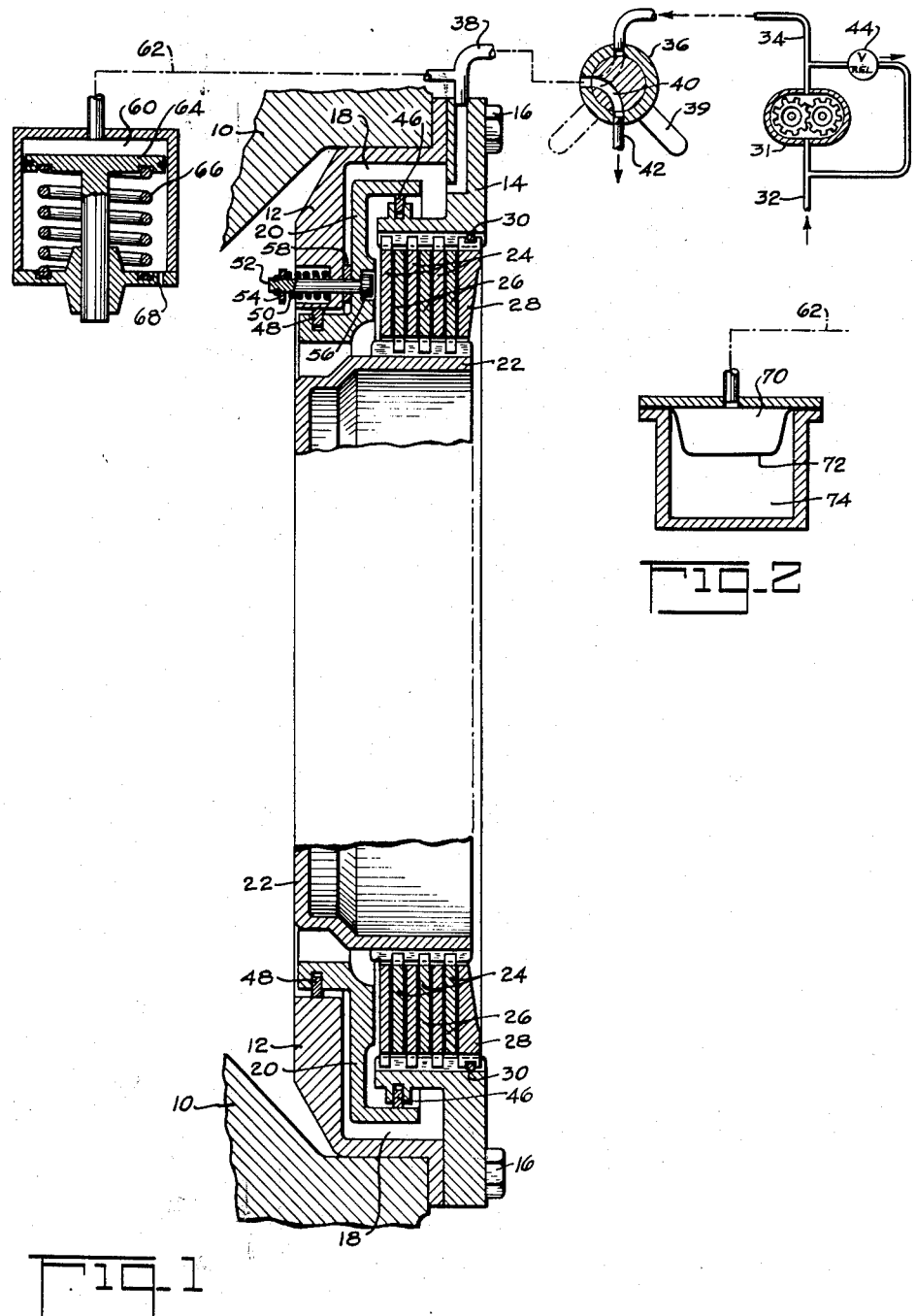

2,727,611

FLUID PRESSURE CONTROL MEANS FOR A CLUTCH OR BRAKE

Cranston W. Folley, Ridgewood, Marshall W. Galliers, Radburn, and Paul F. Horbatt, Fairlawn, N. J., assignors to Curtiss-Wright Corporation, a corporation of Delaware Application April 3, 1951, Serial No. 219,042

2 Claims. (Cl. 192—85)

This invention relates to hydraulically-operable frictionally-engageable clutches or brakes and is particularly directed to such a clutch or brake in which the hydraulic pressure is provided by a power operated pump. As herein used the phrase "power operated" refers to operation by a source of mechanical power as opposed to manual operation.

The invention has been designed for use in connection with a two-speed drive for the supercharger of an aircraft engine for example such as disclosed in copending application Serial No. 609,432, now Patent No. 2,558,738, issued July 3, 1951, and Serial No. 102,192, now Patent No. 2,588,462, issued March 11, 1952, filed August 7, 1945, and June 30, 1949, respectively. As will appear however the invention is not limited to any such specific use. In the case of such a supercharger drive, it has been found that when the supercharger speed control valve is shifted to its high speed position, the rate of engagement of the friction brake plates may be so fast as to subject the engine-driven supercharger drive shaft to excessive torque. Said control valve operation connects the output of an engine-driven positive-displacement gear-type pump to the brake piston cylinder. The pressure in said brake cylinder does not begin to increase until said cylinder becomes full of oil. Because of the incompressible nature of oil and other liquids, the next increment of oil which the pump tends to force into said cylinder causes an extremely rapid and large increase in pressure within said cylinder whereupon there is a corresponding sudden and large increase in the contact pressure of the friction brake plates so that said plates suddenly clamp together. An object of the invention comprises the provision of automatic means for controlling the rate of increase of the contact pressure of the frictionally engageable members of a clutch or brake in which said members are urged into engagement by the hydraulic pressure provided by a power operated pump.

In accordance with the invention, an auxiliary expansion chamber is connected into the hydraulic system between the clutch or brake cylinder and the pump, expansion of said chamber being opposed by a spring or other elastic force.

Other objects of the invention will become apparent upon reading the annexed detailed description in connection with the drawing in which:

Fig. 1 is an axial sectional view illustrating a portion of a transmission having a friction brake embodying the invention; and Fig. 2 is a fragmentary view of a modification of Fig. 1.

Referring first to Fig. 1 of the drawing, reference numeral 10 designates a fragmentary portion of a fixed housing to which an annular member 12 and an annular drum 14 are coaxially secured to screws 16 to form an annular cylindrical space 18 therebetween. An annular piston 20 is slidably fitted in the cylindrical space 18.

An annular rotatable member 22 is co-axially disposed within the drum 14. A first plurality of annular friction brake plates 24 are co-axially disposed between said drum and rotatable member, said plates being axially splined to said drum. A second plurality of annular friction brake plates 26 are co-axially disposed between said drum and rotatable member, the plates 26 being axially splined to said rotatable member and alternating with the plates 24. A backing plate 28 is also secured to the drum 14, said backing plate being restrained against axial movement relative to said drum by a locking wire 30.

A suitable liquid, such as oil, is adapted to be supplied to the brake cylinder or cylindrical space 18 behind the piston 20 for urging said piston toward the friction brake plates 24 and 26 so as to clamp said brake plates together against the backing plate 28 whereupon the rotatable member 22 is held against rotation relative to the fixed housing 10. For this purpose, a gear pump 31 is arranged to supply oil from a passage 32 through a passage 34 to a valve 36, the outlet side of said valve communicating with the brake cylinder 18 through a passage 38. The valve 36 has a handle portion 39 movable to control a valve passage 40. When the valve 36 is open (dot-and-dash line position of the drawing) its passage 40 connects the brake cylinder 18 to the output side of the pump 31 for effecting engagement of the brake plates 24 and 26. When the valve 36 is closed (full-line position of drawing) its valve passage 40 connects the brake cylinder 18 to a drain passage 42 thereby effecting disengagement of the brake plates 24 and 26.

A conventional pressure relief valve 44 is connected around the pump 31 to limit its maximum output pressure. Seal rings 46 and 48 are provided to prevent leakage around the piston 20. In addition, a plurality of circumferentially-spaced springs 50 may be provided for moving the piston 20 away from the friction plates 24 and 26 to insure separation of said plates when the valve 36 is moved to the position (illustrated by full-lines in the drawing) connecting the brake cylinder 18 to the drain passage 42. Each spring 50 encircles one end of a rod 52 and is disposed in compression between a washer 54 secured to said rod end and the fixed member 12. The other end of each rod 52 extends through the piston 20 and has a head portion 56 whereby the force of each spring 50 is transmitted to said piston away from the brake plates. A washer 58 is disposed about each rod 50 between the piston 20 and member 12 to limit the movement of the piston 20 toward the member 12.

The brake structure so far described is conventional. This structure has been designed for use in connection with a multi-speed transmission for the supercharger of an aircraft engine in which the transmission is shifted to high output speed when the brake plates 24 and 26 are clamped in engagement, the rotatable member 22 comprising a reaction member of said transmission and the pump 31 being driven by said engine. By way of example only, said transmission may be similar to any of those illustrated in the aforementioned copending applications. In each said transmission, the transmission output shaft is shifted to high speed upon engagement of a brake which is equivalent to the brake structure so far described. With but the brake structure so far described, if the valve 36 were opened to admit oil to the brake cylinder 18 from the pump 31, then said cylinder would first fill up and at the same time the piston 20 would be moved against the brake plates 24 and 26. The positive displacement pump 31, however, would continue to supply oil to the brake cylinder 18 and because of its incompressible nature the next increment of oil supplied by the pump 31 would cause its output oil pressure to jump to its maximum value whereupon the brake plates 24 and 26 would be suddenly clamped together. If said brake plates are clamped together too fast, then the forces required to accelerate the supercharger to the higher speed may subject the supercharger drive transmitting parts to excessive torque. On the other hand, if the brake plates 24 and 26 should engage too slowly the slipping of the plates as they engage may generate an excessive amount of heat and cause the plates to scuff.

In accordance with the invention, means are provided for controlling the rate of engagement of the brake plates 24 and 26. For this purpose an auxiliary chamber 60 is connected to the passage 38 by a passage 62. One wall of the chamber 60 is formed by a piston 64 slidably fitted therein, a spring 66 being disposed behind said piston for opposing movement of the piston in a direction for increasing the volume of the chamber 60. The rear side of the piston may be vented at 68 to the surrounding atmosphere.

With this expansible construction of the auxiliary chamber 60, when the valve 36 is moved to its open position (dot-and-dash line position in drawing) for admitting oil to the brake cylinder 18, said cylinder fills with oil and at the same time the piston 20 moves against the brake plates 24, 26. This requires only an oil pressure sufficient to overcome the springs 50. As the pump 31 continues to supply oil, the oil pressure within the cylinder 18 will rise but the rate of increase of said oil pressure against the brake plates is now determined by the rate of expansion of the chamber 60 against its spring 66.

As already stated, if the rate of engagement of the brake plates 24 and 26 is too fast, the supercharger drive may be subjected to excessive torque. On the other hand, if the plates 24 and 26 take too long to clamp together after they have been brought into contact, then the slippage between the plates as they are being squeezed together may generate an excessive amount of heat and cause the plates to scuff. Neglecting for the moment any pressure drop through the passage 62, the rate of increase of oil pressure against the brake plates is determined by the rate at which the expansion chamber 60 must expand against the spring 66 to accommodate the oil being supplied by the pump 31. For example said rate could be increased or decreased by increasing or decreasing, respectively, the stiffness of the spring 66 and/or by decreasing or increasing, respectively, the cross-sectional area of the expansion chamber 60. Because of the oil pressure drop through the passage 62, the pressure in the passage 38 and in the brake cylinder 18 will be higher than the pressure in the expansion chamber 60 by an amount equal to said pressure drop so that the pressure in the cylinder 18 will reach the maximum value before the pressure in the expansion chamber reaches said maximum value. Thus the time interval between the time at which the brake plates 24 and 26 are just brought into contact by the piston 20 and the time at which the piston pressure against said plates is a maximum can also be increased or decreased by decreasing or increasing the flow resistance of the passage 62.

The conventional springs 50 have no effect on the rate of increase of oil pressure within the cylinder after the piston 20 has brought the plates 24 and 26 into contact. Because of the springs 50, the oil pressure within the cylinder 18 must first build up to a value sufficient to overcome said springs before the piston 20 can exert any pressure against the brake plates 24 and 26. Thereafter, the spring 66 determines the rate of increase of the pressure against the brake plates.

Preferably the spring 66 is not pre-stressed in compression whereby said spring exerts no force against the piston 64 when the supply of oil is cut off by the valve 36. With this arrangement, when the valve 36 is opened, the contact pressure between the plates 24 and 26 progressively builds up from zero at a rate determined by the spring 66. If, however, the spring 66 were pre-compressed, then the contact pressure between the friction brake plates would suddenly jump to a value determined by the magnitude of said pre-compression and thereafter said contact pressure would build up to its maximum value at a rate determined by the spring 66.

Instead of the mechanical spring 66 other yieldable elastic means could be substituted for the spring 66. For example, in Fig. 2 a closed chamber containing an elastic fluid has been substituted for the spring 66. Only that much of Fig. 2 differing from Fig. 1 has been illustrated. In Fig. 2, a chamber 70 has one side closed by a flexible member 72, such as a rubber diaphragm. The other side of the flexible member 72 seals a chamber 74 containing a gaseous fluid. With this construction of Fig. 2, the fluid sealed within the chamber 74 provides an elastic force opposing expansion of the chamber 70. Except for the chamber 70 and the particular elastic means opposing its expansion, the embodiment of Fig. 2 is identical to that of Fig. 1. Thus the chamber 70 is in communication with the oil supply passage 38 and cylinder 18 through the passage 62. The operation of Fig. 2 is substantially equivalent to that of Fig. 1.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a clutch or brake having frictionally engageable clutch or brake members: hydraulic mechanism for effecting engagement of said members; said mechanism comprising a cylinder; a piston slidable within said cylinder; a power operated positive-displacement hydraulic pump; a pressure relief valve for limiting the maximum pump output pressure; a passageway providing communication between said cylinder and the output side of said pump for supplying liquid to said cylinder against said piston for moving said piston to effect engagement of said members; a valve for said passageway for controlling the supply of said liquid therethrough from said pump to said cylinder; an auxiliary chamber communicating with said passageway on the cylinder side of said control valve, said auxiliary chamber having a wall movable in response to an increase in the pressure in said passageway on the cylinder side of said control valve for increasing the volume of said chamber in communication with said passageway; and elastic means opposing said chamber wall movement such that said wall is movable against said elastic means in response to pressure increases in said passageway on the cylinder side of said control valve at pressures below said maximum value.

2. In a clutch or brake for a multi-speed transmission in which said clutch or brake includes members frictionally engageable to effect a speed-ratio change of said transmission: hydraulic mechanism for effecting engagement of said members; said mechanism comprising a cylinder; a piston slidable within said cylinder; a power-operated positive-displacement hydraulic pump continuously operative during operation of the transmission; a pressure relief valve for limiting the maximum pump output pressure; a passageway providing communication between said cylinder and the output side of said pump for supplying liquid to said cylinder against said piston for moving said piston to effect engagement of said members; a valve for said passageway for controlling the supply of said liquid therethrough from said pump to said cylinder, said control valve being movable independently of said pressure relief valve; an auxiliary chamber communicating with said passageway on the cylinder side of said control valve, said auxiliary chamber having a wall movable in response to an increase in the pressure in said passageway on the cylinder side of said control valve for increasing the volume of said chamber in communication with said passageway; and elastic means opposing said chamber wall movement such that said wall is movable against said elastic means in response to pressure increases in said passageway on the cylinder side of said control valve at pressures below said maximum value.

References Cited in the file of this patent

UNITED STATES PATENTS

| | | |
|---|---|---|
| 1,611,545 | Maybach | Dec. 21, 1926 |
| 1,758,370 | Olsen et al. | May 13, 1930 |
| 2,100,810 | Livermore | Nov. 30, 1937 |
| 2,105,625 | Wichtendahl | Jan. 18, 1938 |
| 2,450,161 | Price | Sept. 28, 1948 |
| 2,459,663 | Majneri | Jan. 18, 1949 |
| 2,472,694 | Choving | June 7, 1949 |
| 2,632,544 | Hockert | Mar. 24, 1953 |

FOREIGN PATENTS

| | | |
|---|---|---|
| 524,702 | Great Britain | Aug. 13, 1940 |